(12) United States Patent
Schwefer et al.

(10) Patent No.: US 9,108,175 B2
(45) Date of Patent: Aug. 18, 2015

(54) DEVICE AND METHOD FOR CATALYTIC GAS PHASE REACTION AND THE USE THEREOF

(75) Inventors: Meinhard Schwefer, Meschede (DE); Michael Groves, Gevelsberg (DE); Jürgen Fuchs, Dortmund (DE); Rainer Maurer, Schwelm (DE); Rolf Siefert, Rheda-Wiedenbrück (DE); Bernhard Hündgen, Dinslaken (DE)

(73) Assignee: UHDE GMBH, Dortmung (DE)

( * ) Notice: Subject to any disclaimer, the term of this patent is extended or adjusted under 35 U.S.C. 154(b) by 1549 days.

(21) Appl. No.: 12/451,874

(22) PCT Filed: May 28, 2008

(86) PCT No.: PCT/EP2008/004232
§ 371 (c)(1),
(2), (4) Date: Jan. 21, 2010

(87) PCT Pub. No.: WO2008/148487
PCT Pub. Date: Dec. 11, 2008

(65) Prior Publication Data
US 2010/0166631 A1 Jul. 1, 2010

(30) Foreign Application Priority Data
Jun. 6, 2007 (DE) .......................... 10 2007 026 712

(51) Int. Cl.
*B01J 8/02* (2006.01)
*B01J 8/00* (2006.01)
(Continued)

(52) U.S. Cl.
CPC .. *B01J 8/008* (2013.01); *B01J 8/02* (2013.01); *B01J 8/025* (2013.01); *B01J 8/0278* (2013.01); *B01J 8/0285* (2013.01); *B01J 15/005* (2013.01);
(Continued)

(58) Field of Classification Search
CPC ........................................... B01J 8/02
USPC ........................... 422/201, 203, 222; 423/237
See application file for complete search history.

(56) References Cited

U.S. PATENT DOCUMENTS

| 3,576,600 A | 4/1971 | Hardison | 23/162 |
| 4,343,626 A * | 8/1982 | Peise et al. | 48/67 |

(Continued)

FOREIGN PATENT DOCUMENTS

| EP | 0 334 710 A1 | 9/1989 | B01J 19/24 |
| EP | 1 028 089 A1 | 8/2000 | C01B 21/28 |

*Primary Examiner* — Walter D Griffin
*Assistant Examiner* — Huy-Tram Nguyen
(74) *Attorney, Agent, or Firm* — Michael W. Ferrell; Ferrells, PLLC; Anna L. Kinney

(57) ABSTRACT

Improved reactors for catalytic, exothermic gas-phase reactions having, viewed in the flow direction of a feed gas, an inlet zone (1), a reaction zone (2) containing at least one catalyst (4), and an outlet zone (3) for the product gas, are described. The reactors are provided in the inlet zone (1) or in the inlet zone (1) and the reaction zone (2) with an insulating liner (6) and/or apparatuses for the transport of cooling media and/or the interior walls of the reactor in the inlet zone (1) or in the inlet zone (1) and the reaction zone (2) consist of inert material. The insulating liner and/or cooling media reduce heat transport from the reaction zone (2) into the inlet zone (1) and thus reduce the risk of preignition of the feed gas mixture used or occurrence of undesirable secondary reactions in the inlet zone (1).

57 Claims, 7 Drawing Sheets

(51) Int. Cl.
- B01J 15/00 (2006.01)
- B01J 19/00 (2006.01)
- C01B 21/26 (2006.01)
- C01B 21/28 (2006.01)

(52) U.S. Cl.
CPC ............ B01J 19/002 (2013.01); C01B 21/265 (2013.01); C01B 21/28 (2013.01); *B01J 2208/0053* (2013.01); *B01J 2208/00176* (2013.01); *B01J 2208/00203* (2013.01); *B01J 2208/00212* (2013.01); *B01J 2208/00495* (2013.01); *B01J 2208/00716* (2013.01); *B01J 2219/00006* (2013.01); *B01J 2219/00263* (2013.01); *B01J 2219/025* (2013.01)

(56) References Cited

U.S. PATENT DOCUMENTS

| | | | | |
|---|---|---|---|---|
| 4,482,669 | A * | 11/1984 | Seyferth et al. | 524/442 |
| 4,544,525 | A * | 10/1985 | Honda et al. | 422/171 |
| 5,266,291 | A | 11/1993 | Drnevich et al. | 423/392 |
| 6,329,434 | B1 * | 12/2001 | Wen et al. | 518/703 |
| 6,743,404 | B1 * | 6/2004 | Schumacher et al. | 423/239.1 |

\* cited by examiner

DEVICE AND METHOD FOR CATALYTIC GAS PHASE REACTION AND THE USE THEREOF

CLAIM FOR PRIORITY

This substitute specification is a submitted as a national phase entry of International Patent Application No. PCT/EP2008/004232, filed May 28, 2008, entitled "Device and Method for Catalytic Gas Phase Reactions and the Use Thereof" which claims priority to German Patent Application 10 2007 026 712.8, filed Jun. 6, 2007, of the same title. The priorities of International Patent Application No. PCT/EP2008/004232 and German Patent Application 10 2007 026 712.8 are hereby claimed and the references are incorporated herein in their entireties.

BACKGROUND OF THE INVENTION

The present invention relates to improved reactors for catalytic gas-phase reactions and processes to be carried out therewith, in particular improved oxidation processes such as processes for the oxidation of ammonia which can be used, for example, as components in the preparation of caprolactam or in particular of nitric acid.

In carrying out catalytic gas-phase reactions, heat of reaction is evolved in many cases. The temperature increase caused thereby in the interior of the reactor can represent a hazard, in particular when explosive starting material mixtures are employed.

The heat evolved in exothermic gas-phase reactions can reach the sections of the reactor located upstream of the reaction zone, for example by thermal conduction via the heated reactor walls, by convection due to swirling reaction gases traveling in the countercurrent direction or as a result of heat radiation. As a consequence of this heat transport, the feed gas can be heated so strongly before reaching the reaction zone that undesirable secondary reactions or uncontrolled prereactions can occur before reaching this zone.

An example of an exothermic gas-phase reaction which is carried out industrially on a large scale is the preparation of nitric acid ("$HNO_3$"). This is generally carried out on an industrial scale by catalytic oxidation of ammonia over Pt/Rh catalysts in the Ostwald process. Here, $NH_3$ is oxidized very selectively to NO which is then oxidized to $NO_2$ during the course of the further process and is finally reacted with water in an absorption tower to give $HNO_3$. The Pt/Rh catalysts are configured as fine gauzes and are stretched over a wide area in a burner. Typical dimensions for these gauzes are diameters of 0.5-5 m. The thickness of the gauze packing is usually, depending on the number of gauzes used, from a few millimeters to a maximum of 2 centimeters. A gas mixture typically comprising about 8-12% by volume of ammonia and air is passed through the gauzes, with a temperature of about 850-950° C. being established at the gauzes due to the exothermic reaction.

The hot reaction gas is subsequently cooled in a heat exchanger in which steam is generated or process gas is heated.

The reason for the catalyst geometry chosen, viz. a large diameter and very small height of the gauzes, is that the oxidation of $NH_3$ firstly has to occur at a very short residence time because of possible subsequent reaction of the NO and, secondly, the pressure drop caused by flow through the gauzes and mechanical stress on the gauzes have to be kept as low as possible. Thus, flow through the gauzes in industrial $HNO_3$ production occurs at a relatively low linear velocity of, depending on the pressure range, about 0.4-1.0 m/s under atmospheric conditions, about 1-3 m/s in the case of intermediate-pressure combustion in the range 3-7 bar abs and about 2-4 m/s in the case of high-pressure combustion in the range 8-12 bar abs, with the velocities indicated being superficial velocities for the gas which has been heated by the heat of reaction. In addition, if the flow is too fast, the reaction on the Pt/Rh gauzes can be extinguished by the cooling action of the inflowing gas stream ("blow-out" phenomenon).

The lower limit for the inflow velocity of the ammonia/air mixture is marked by the flame velocity of possible thermal ammonia combustion, so that flashback of the reaction ignited on the catalyst into the free gas space upstream of the catalyst bed can be ruled out in any case.

Apart from the classical gauze catalysts, the use of base metal catalysts based on transition metal oxides for the oxidation of ammonia is described in the scientific and patent literature. These can be used either alone or in combination with Pt/Rh gauzes.

A review of this literature may be found, for example, in Sadykov at al., Appl. Catal. General A: 204 (2000) 59-87. The driving force for the use of base metal catalysts is the saving of noble metals, in particular platinum. Nobel metal catalysts are consumed in the oxidation of ammonia and therefore have to be replaced, depending on the throughput through the gauzes, at intervals of from about three months to one year, which incurs considerable costs.

The catalysts based on transition metal oxides are usually, like the Pt/Rh gauze catalysts, operated at relatively low inflow velocities. This is necessary, in particular, to avoid extinguishing the oxidation of ammonia again after it has been ignited on the catalyst. Catalysts based on transition metal oxides are generally less active than noble metal catalysts and compared to the latter have a significantly higher ignition temperature and also a higher extinguishing temperature.

WO-A-99/25,650 describes how the "blow-out" temperature can be decreased by the use of very finely particulate catalyst pellets accommodated in cartridges without the pressure drop being allowed to increase too much.

In the catalytic oxidation of ammonia, there is always the problem that ammonia can ignite before contact with the actual oxidation catalyst, e.g. on hot tube walls, and in this way be burned unselectively to $N_2$ and $H_2O$ or $N_2O$.

EP-A-1,028,089 states that back-radiation from ammonia combustion to distributor units for conveying the $NH_3$/air mixture can lead to heating of these internals as a result of which part of the inflowing $NH_3$ is oxidized to $N_2O$ on the surface of these internals.

The problem of $NH_3$ preignition is of particular significance at the industrially relevant, high $NH_3$ concentrations of 8-12% by volume, since here combustion is self-sustaining and can even be reinforced as a result of the heat evolved in the reaction.

In addition to the actual ignition temperature, i.e. the critical surface temperature above which $NH_3$ decomposition can occur, the removal of the heat liberated by $NH_3$ decomposition is therefore also of critical importance.

This removal is improved the faster the gas stream laden with ammonia flows over the surfaces (cooling action) and the colder this stream is. In addition, the residence time of the feed gas stream before contacting with the catalyst is shortened and the reaction time of the possible unselective prereaction is thus also shortened.

In the industrial preparation of $HNO_3$ by oxidation of ammonia over Pt/Rh gauzes, the low initiation temperature of the highly active Pt/Rh catalysts makes a relatively low inlet temperature of about 200° C. possible. In this way, ammonia preignition is no obstacle to industrial implementation of the process despite the low inflow velocities.

However, when catalysts having a low catalytic activity are used, the feed gas mixture has to be at higher temperatures (preheating) or the process has to be operated at lower inflow velocities, or preferably a combination of the two measures has to be employed. Under these conditions, the risk of ammonia preignition is increased.

Experiments using honeycomb catalysts which, compared to platinum gauzes, have a lower cross section and a greater depth of the catalyst bed have now shown that the selectivity to the formation of the desired $NO_x$ is only very small at low inflow velocities of the feed gas mixture. The economics of such a process is therefore questionable. This effect could theoretically be compensated by increasing the inflow velocity of the feed gas mixture. However, increasing the inflow velocity is in practice subject to limitations since a disproportionate increase in the pressure drop occurs and, in addition, only incomplete combustion of the ammonia is achieved under some circumstances.

The same problems exist in principle in other industrially operated exothermic gas-phase reactions, e.g. oxidation reactions other than the oxidation of ammonia, epoxidations or free-radical halogenations of hydrocarbons.

SUMMARY OF THE INVENTION

It is an object of the present invention to provide a reactor and a process for catalytic exothermic gas-phase reactions in which the risks of preignition of the feed gas or feed gas mixture used and the occurrence of undesirable secondary reactions are reduced.

DETAILED DESCRIPTION OF THE INVENTION

The invention is described in detail below by reference to the various drawings and examples. Such discussion is for purposes of illustration only. Modifications to particular examples within the spirit and scope of the present invention, set forth in the appended claims, will be readily apparent to one of skill in the art. Terminology used herein is given its ordinary meaning unless otherwise stated herein.

The present invention provides a reactor for catalytic, exothermic gas-phase reactions by reaction of a feed gas to form a product gas, which comprises, viewed in the flow direction of the feed gas, an inlet zone (1), a reaction zone (2) containing at least one catalyst (4) and an outlet zone (3) for the product gas, wherein the region of the inlet zone (1) or the region of the inlet zone (1) and the reaction zone (2) is provided with means which reduce heat transport from the reaction zone (2) into the inlet zone (1) and/or the interior walls of the reactor in the region of the inlet zone (1) or in the region of the inlet zone (1) and the reaction zone (2) consist of inert material.

The feed gas is fed into the reactor via the inlet zone (1) and then flows through the reaction zone (2) in which the catalyst (4) is located. There, the feed gas reacts completely or partially in an exothermic reaction to form the product gas which subsequently leaves the reactor through the outlet zone (3). Due to the heat generated in the reaction zone (2), there is a risk of at least part of this heat being transported in countercurrent to the feed gas to the inlet zone (1) by conduction, convection and/or radiation and there heating the feed gas or the surface of the reactor wall in the inlet zone (1) in an unacceptable way.

To prevent or at least hinder this, the region of the inlet zone (1) or the region of the inlet zone (1) and the reaction zone (2) is, in a first embodiment of the invention, provided with means which reduce heat transport from the reaction zone (2) into the inlet zone (1).

In a further embodiment of the invention, the interior walls of the reactor in the region of the inlet zone (1) or the region of the inlet zone (1) and the reaction zone (2) are made of inert material. This embodiment prevents or hinders catalytic reaction of the feed gas at the interior walls of the reactor.

For the purposes of this description, the term "inert material" refers to all materials which do not promote any undesirable secondary reactions at the temperatures prevailing in the feed gases in the inlet zone or at the temperatures at the surfaces of the interior wall of the inlet zone. These materials can additionally reduce heat transport from the reaction zone (2) to the inlet zone (1). Inert and thermally insulating materials comprise a preferred embodiment.

The inert materials cover the interior walls of the reactor. They are, for example, applied to the interior walls of the reactor or are present in the form of sleeves in the reactor or the reactor walls consist of inert materials.

Examples of inert materials are ceramics, in particular ceramics sintered to a high density, and also fused silica, shamotte, enamel or metals having polished surfaces. As means of reducing heat transport from the reaction zone (2) to the inlet zone (1), it is possible to use various approaches to a solution.

In one embodiment, the region of the inlet zone (1) or the region of the inlet zone (1) and the reaction zone (2) is provided with an insulating liner (6) which insulates the interior space of the reactor from the reactor wall (5). This insulating liner (6) works in essentially two ways. Heat which travels along the thermally readily conducting reactor wall (5) from the reaction zone (2) to the inlet zone (1) can be transported only with difficulty through the poorly thermally conducting insulation liner (6) on the surface facing the feed gas. In addition, direct conduction of heat along the insulating liner (6) from the reaction zone (2) to the inlet zone (1) is reduced as a result of the low thermal conductivity of the insulating liner (6).

In a second embodiment, the region of the inlet zone (1) or the region of the inlet zone (1) and the reaction zone (2) is provided with an apparatus through which a cooling medium can be passed. This apparatus takes up part of the heat generated in the reaction zone (2), so that this heat is no longer available for heat transport into the inlet zone (1) and/or so that this heat is introduced into the feed gas at a place in the inlet zone (1) at which the feed gas is still so cool that the temperature increase caused by introduction of the cooling medium is not critical; or the cooling medium cools the inlet zone (1) adjacent to the reaction zone (2) to such a degree that the temperature of the inlet zone (1) remains in the noncritical range despite the heat carried away from the reaction zone (2). Particular preference is given to a reactor having a combination of the two measures.

In a further preferred embodiment, the reactor of the invention is provided in the region of the inlet zone (1) or in the region of the inlet zone (1) and the reaction zone (2) with means which reduce heat transport from the reaction zone (2) into the inlet zone (1) and the interior walls of the reactor in the region of the inlet zone (1) or in the region of the inlet zone (1) and the reaction zone (2) consist of inert material.

The invention also provides a process for carrying out catalytic exothermic gas-phase reactions using the above-described reactor.

The process comprises the following measures:
i) introduction of a feed gas into an inlet zone (1) of a reactor,
ii) introduction of the feed gas into a reaction zone (2) containing a catalyst (4) under conditions under which the feed gas is entirely or partly converted into a product gas in an exothermic reaction in the reaction zone (4),
iii) discharge of the product gas from the reactor via an outlet zone (3) and
iv) provision of means for reducing the transport of heat of reaction from the reaction zone (2) to the inlet zone (1) and/or use of a reactor whose interior walls in the region of the inlet zone (1) or in the region of the inlet zone (1) and the reaction zone (2) consist of inert material.

As feed gases, it is possible to use a variety of gases or preferably gas mixtures. The nature of these gases or gas mixtures is not critical as long as they are feed gases or feed gas mixtures which can be catalytically reacted in an exothermic reaction in the gas phase in the reactor of the invention.

Examples of chemical reactions which can be carried out in the reactor of the invention are oxidation reactions of all types and other exothermic free-radical gas-phase reactions, e.g. halogenation reactions.

The reactor of the invention is preferably used for the oxidation of ammonia, in particular for the preparation of caprolactam and nitric acid.

Preference is likewise given to using the reactor of the invention for carrying out the Andrussow reaction, in particular for preparing hydrogen cyanide from ammonia, oxygen and hydrocarbons, preferably methane.

In the description below, the oxidation of ammonia to produce nitric acid will be described in more detail by way of example as a model reaction. However, the reactor and process of the invention are, as indicated above, also suitable in principle for other reactions.

As catalysts, it is possible to use all catalysts which are suitable for the respective target reaction or target reactions. These can be used, for example, in pure form as all-active catalyst or in supported form. It is also possible to use all customary catalyst geometries, for example pellets, granules, extrudates or powder in the form of beds, packings, gauzes or other forms, for example in the form of monolithic honeycombs.

According to the invention, it is possible to use, in particular, catalysts containing transition metal oxide, as are described, for example, in Appl. Catal. General A: 204 (2000) 59-87, in U.S. Pat. No. 5,690,900 or in EP-A-946,290.

Particularly useful catalysts are cobalt-containing catalysts. As structural type, perovskites are particularly advantageous.

Preference is given, according to the invention, to using catalysts in honeycomb form for the oxidation of ammonia. These can, for example, be in the form of all-active honeycomb catalysts or in supported form as honeycomb supports on which and/or into which catalytically active material has been applied/introduced.

Particular preference is given to using catalysts, for example in the form of beds, packings or honeycombs, which, viewed in the flow direction, have a depth of at least 3 cm, preferably at least 5 cm, in particular at least 10 cm and very particularly preferably from 10 to 200 cm.

BRIEF DESCRIPTION OF THE DRAWINGS

The following examples and figures illustrate the invention without restricting its scope. In the figures.

DETAILED DESCRIPTION OF THE DRAWINGS

The Figures are described in detail in the following examples.

EXAMPLE 1

Figure 1:
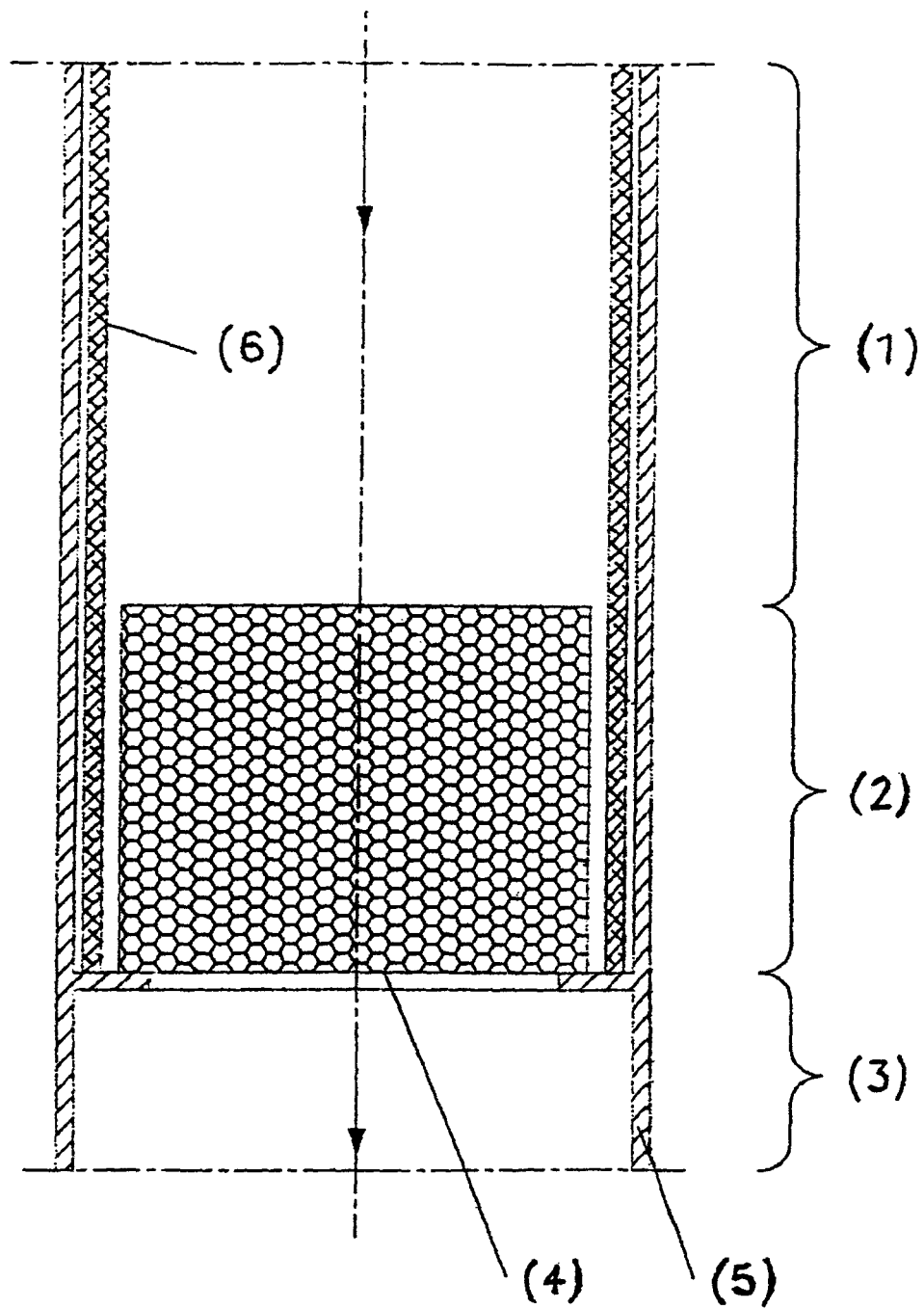
FIG. 1 shows an apparatus according to the invention in longitudinal section.

In FIG. 1, the main features of the invention are illustrated by an ammonia oxidation apparatus according to the invention.

An ammonia oxidation apparatus can be divided into three zones, namely an inlet zone (1), a reaction zone (2) and an outlet zone (3).

The ammonia/oxygen-containing gas mixture (hereinafter "feed gas mixture") is introduced into the inlet zone (1) and impinges on the ammonia oxidation catalyst (4) in the subsequent reaction zone (2). The product gas mixture from the oxidation reactions then leaves the reaction zone (2) through the outlet zone (3).

In the embodiment shown in FIG. 1, all three zones (1, 2, 3) of the apparatus according to the invention are surrounded by a wall (5) which is additionally a support for the catalyst (4) and for an insulating liner (6). The wall (5) can itself represent the walls of a pressure vessel or alternatively the wall can be accommodated in a space which in turn is surrounded by a pressure jacket which is not shown in FIG. 1.

The thermal decoupling of inlet zone (1) and reaction zone (2) is effected by the insulating liner (6) which consists of a thermally insulating and gas tight material. The insulating liner (6) prevents or hinders heat reaching the inlet zone (1) as a result of thermal conduction through the wall (5) of the reaction zone (2) from being transferred to the feed gas mixture. The part of the wall (5) located in the inlet zone does become hotter by thermal conduction of the heat of reaction from the reaction zone (2), but the transport of the heat to the feed gas mixture is greatly inhibited by the thermally insulating liner (6). Since the insulating liner (6) has only a low thermal conductivity, the insulating liner (6) also prevents or hinders direct transport of heat along the insulating liner (6) from the reaction zone (2) to the inlet zone (1). As a result of appropriate choice of materials and the thickness of the insulating liner (6), the temperature of the wall of the insulating liner (6) facing the feed gas mixture remains below the ignition or reaction temperature of the feed gas mixture and undesirable premature reactions are suppressed.

EXAMPLE 2

Figure 2:
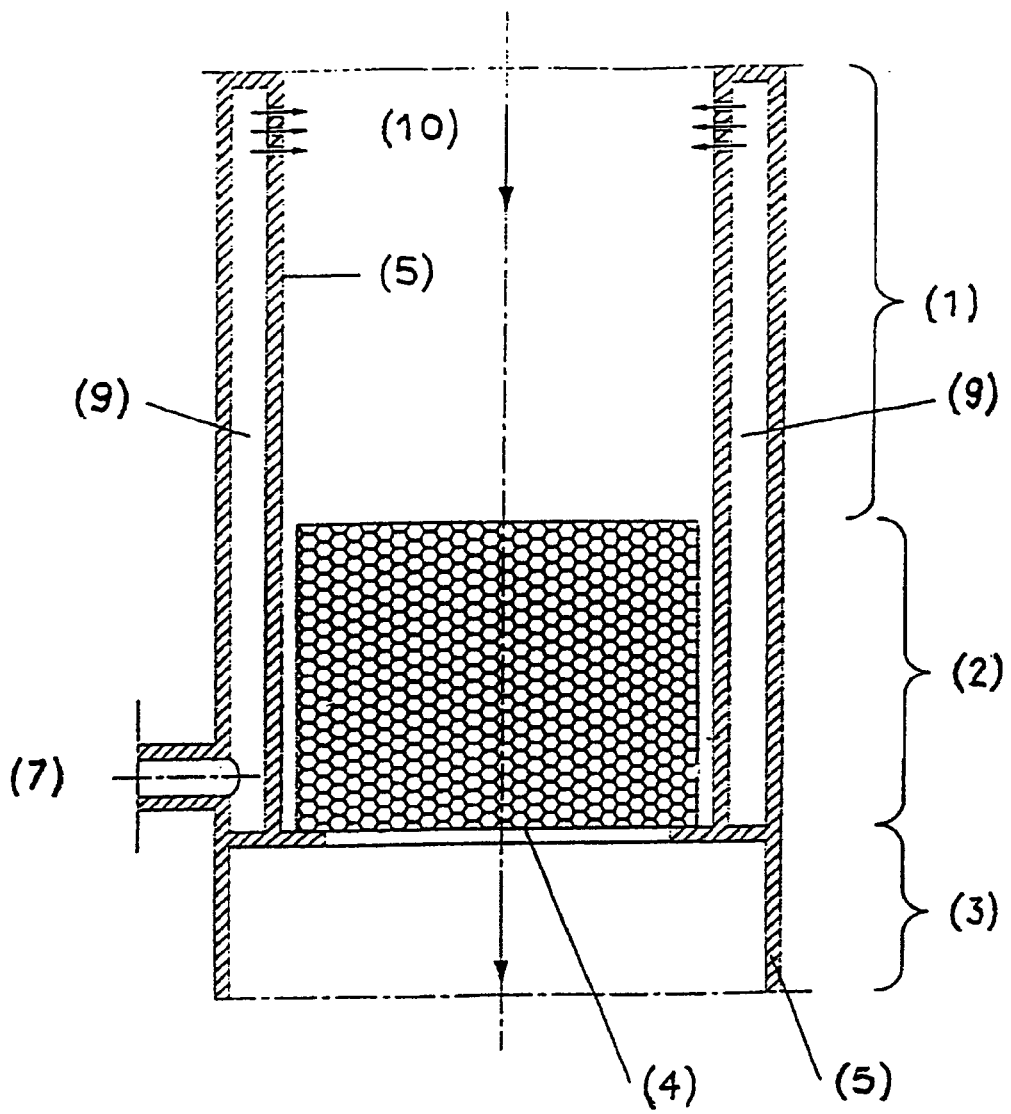
FIG. 2 shows a further apparatus according to the invention in longitudinal section.

FIG. 2 shows an apparatus similar to that shown in FIG. 1. Except for the mode of thermal decoupling between inlet zone and reaction zone (1, 2), this embodiment is similar to the apparatus of example 1.

This ammonia oxidation apparatus also comprises an inlet zone (1), reaction zone (2) and outlet zone (3).

The ammonia/oxygen-containing gas mixture is introduced into the inlet zone (1). The mixture then impinges on the ammonia oxidation catalyst (4) in the reaction zone (2). The product mixture from the oxidation reactions subsequently leaves the reaction zone (2) through the outlet zone (3).

The wall (5) of all three zones holds the catalyst (4). The wall (5) can itself be the walls of a pressure vessel or the wall can alternatively be accommodated in a space which is in turn surrounded by a pressure jacket (not shown here).

At the height of the inlet zone and reaction zone (1, 2), the wall (5) is configured as a double wall. At the end of the double wall at the height of the reaction zone (2), there is an inlet (7) for a cooling medium which is compatible with the feed gas mixture, the reactions desired in the reactor, the catalyst (4) and the product gas mixture. For use in nitric acid plants, it is possible to use, for example, air as suitable cooling medium.

The cooling medium flows through the space (9) in the double wall and cools the inner wall of the wall (5). This achieves thermal decoupling of the inlet zone (1) from the reaction zone (2) since the heat reaching the inlet zone (1) from the reaction zone (2) as a result of thermal conduction through the wall (5) is transferred to the cooling medium.

The cooling medium enters the inlet zone (1) through a plurality of small openings (10) at the end of the double wall at the height of the inlet zone (1) and mixes with the feed gas mixture.

The temperature in the feed gas mixture and at the inner surface of the wall (5) can be kept below the ignition or reaction temperature of the feed gas mixture by appropriate choice of the distances between inlet (7) and openings (10) and by appropriate choice of type, amount, flow rate and entry temperature of the cooling medium, so that undesirable premature reactions are suppressed.

EXAMPLE 3

Figure 3:
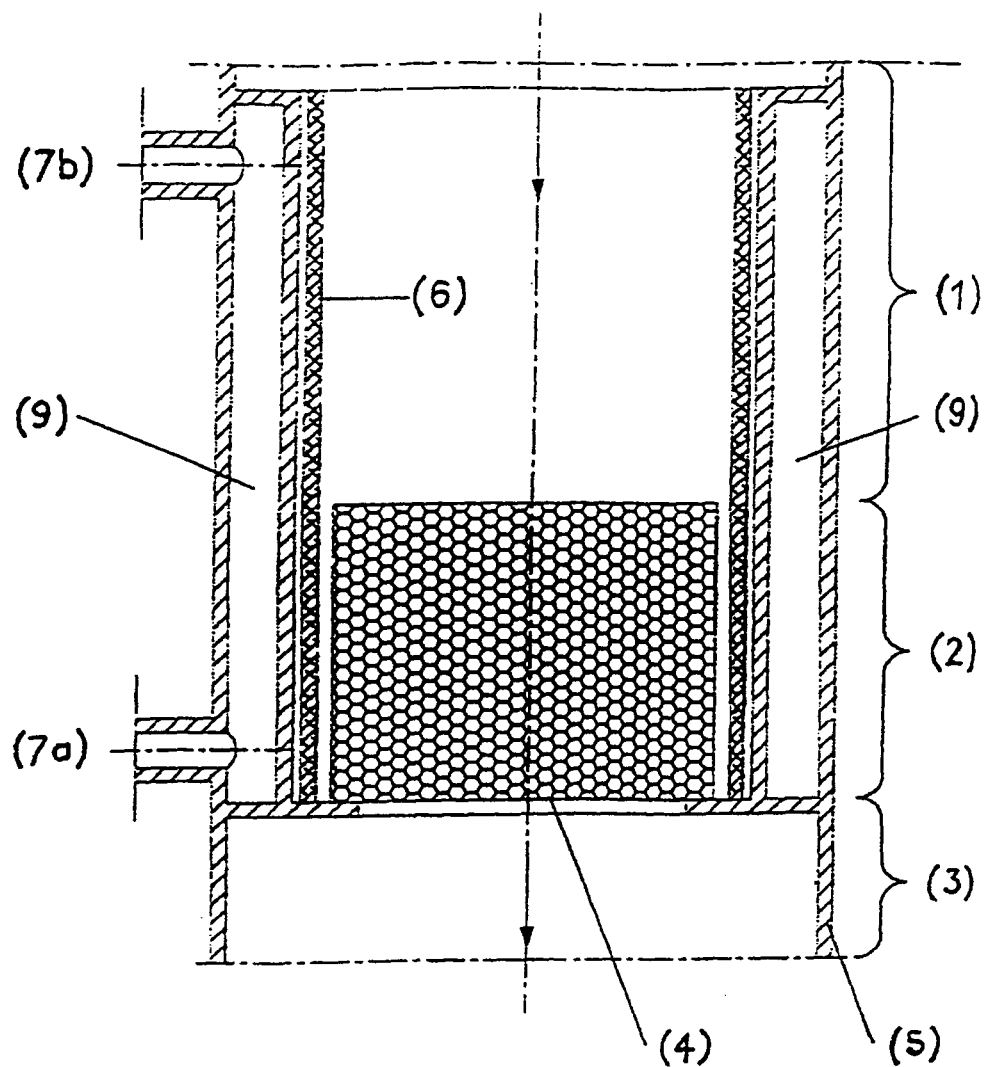
FIG. 3 shows a further apparatus according to the invention in longitudinal section.

FIG. 3 shows an apparatus according to the invention which allows particularly effective thermal decoupling of inlet zone and reaction zone.

This ammonia oxidation apparatus also comprises an inlet zone (1), reaction zone (2) and outlet zone (3).

The ammonia/oxygen-containing gas mixture is introduced into the inlet zone (1). The mixture then impinges on the ammonia oxidation catalyst (4) in the reaction zone (2). The product mixture from the oxidation reactions subsequently leaves the reaction zone (2) through the outlet zone (3).

The wall (5) of all three zones holds the catalyst (4) and the insulating liner (6). The wall (5) can itself represent the walls of a pressure vessel or the wall (5) can alternatively be accommodated in a space which is in turn surrounded by a pressure jacket (not shown here).

At the height of the inlet zone and reaction zone (1, 2), the wall (5) is configured as a double wall. Connections (7a, 7b) for a cooling medium are also provided there. Suitable cooling media are, for example, water or air. The cooling medium can flow in cocurrent or countercurrent to the flow direction of the feed gas mixture. Thermal decoupling of the inlet zone (1) from the reaction zone (2) is effected both by the insulating liner (6) and the passage of a cooling medium through the space (9) between the double walls of the wall (5).

The insulating liner (6) which consists of a thermally insulating material and covers the wall (5) at the height of the reaction zone (2) and the inlet zone (1) prevents heat which has reached the inlet zone (1) from the reaction zone (2) as a result of thermal conduction through the wall (5) from being transferred to the feed gas mixture. Since the insulating liner (6) has only a low thermal conductivity, the insulating liner (6) also prevents or hinders direct heat transport along the insulating liner (6) from the reaction zone (2) to the inlet zone (1). As shown in FIGS. 1, 2 and 3, the insulating liner (6) not only covers the wall (5) at the height of the reaction zone (2) and the inlet zone (1) but also is spaced away from both the wall (5) and the catalyst (4).

The cooling medium flows through the space (9) in the double wall of the wall (5) and cools the inner wall of the wall (5). This effects further thermal decoupling of the inlet zone (1) from the reaction zone (2) since heat reaching the inlet zone (1) from the reaction zone (2) by thermal conduction through the wall (5) is transferred to the cooling medium. After flowing through the double wall, the cooling medium leaves the space (9) between the double walls again through one of the connections (7a, 7b).

The action of the insulating liner (6) is in this way reinforced by the cooling by means of the cooling medium. As a result of suitable choice of insulating materials and their thickness and also of the cooling medium, the temperature of the wall of the insulating liner (6) facing the feed gas mixture remains below the ignition or reaction temperature of the feed gas mixture and undesirable premature reactions are suppressed.

EXAMPLE 4

Figure 4:
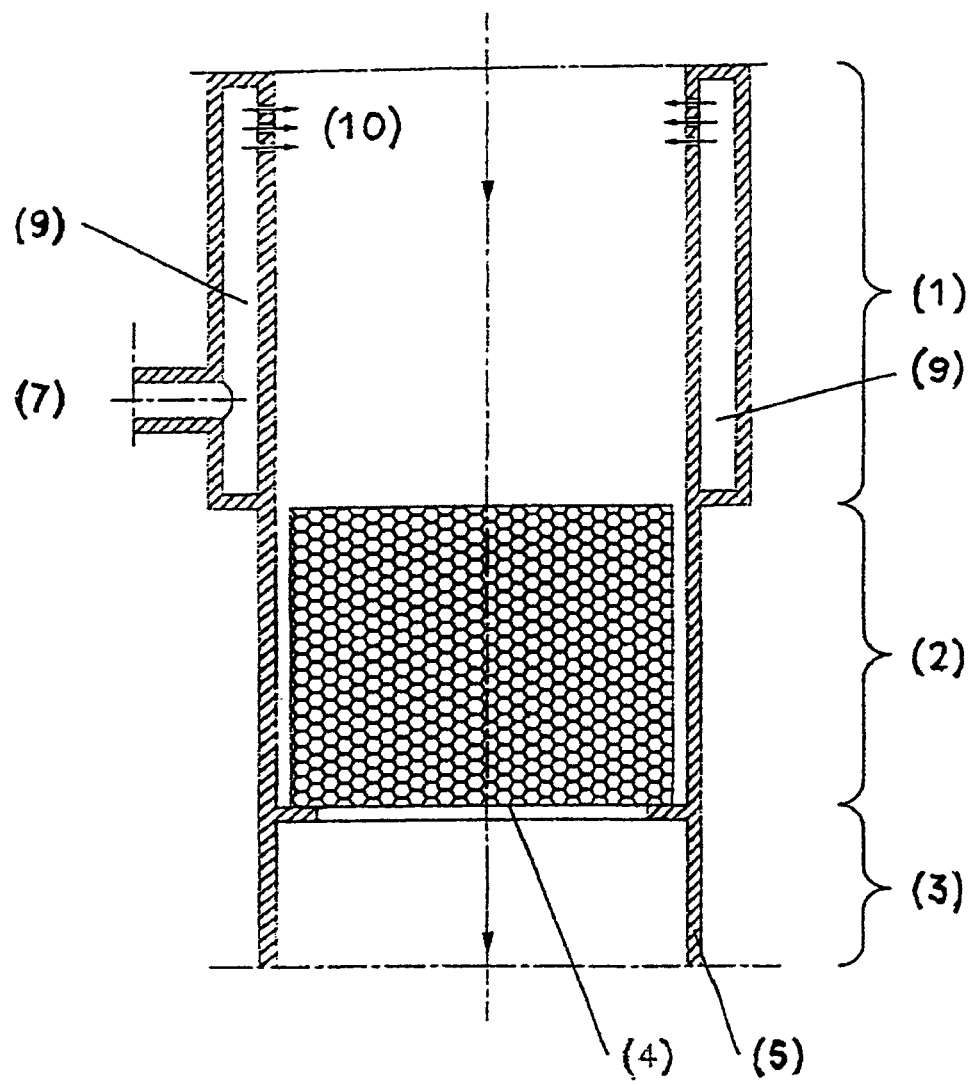
FIG. 4 shows a further apparatus according to the invention in longitudinal section.

FIG. 4 shows an apparatus similar to that in FIG. 2. Here, thermal decoupling between inlet zone and reaction zone (1, 2) is effected by cooling of the inlet zone.

This ammonia oxidation apparatus also comprises an inlet zone (1), reaction zone (2) and outlet zone (3).

The ammonia/oxygen-containing gas mixture is introduced into the inlet zone (1). The mixture then impinges on the ammonia oxidation catalyst (4) in the reaction zone (2). The product mixture from the oxidation reactions subsequently leaves the reaction zone (2) through the outlet zone (3).

The wall (5) of all three zones holds the catalyst (4). The wall (5) can itself represent the walls of a pressure vessel or the wall can alternatively be accommodated in a space which is in turn surrounded by a pressure jacket (not shown here).

At the height of the inlet zone (1), the wall (5) is configured as a double wall. At the end of the double wall in the vicinity of the reaction zone (2), there is an inlet (7) for a cooling medium which is compatible with the feed gas mixture, the reactions desired in the reactor, the catalyst (4) and the product gas mixture. For use in nitric acid plants, it is possible to use, for example, air as suitable cooling medium.

The cooling medium flows through the space (9) in the double wall and cools the inner wall of the wall (5) at the height of the inlet zone (1). This effects thermal decoupling of the inlet zone (1) from the reaction zone (2) since heat reaching the inlet zone (1) from the reaction zone (2) as a result of thermal conduction through the wall (5) is transferred to the cooling medium.

The cooling medium enters the inlet zone (1) through a plurality of small openings (10) at the end of the double wall at which the feed gas flows into the reactor, so that the cooling medium mixes with the feed gas mixture.

The temperature in the feed gas mixture and at the inner surface of the wall (5) can be kept below the ignition or reaction temperature of the feed gas mixture by suitable choice of the distances between inlet (7) and openings (10) and by suitable choice of type, amount, flow rate and entry temperature of the cooling medium, so that undesired premature reactions are suppressed.

EXAMPLE 5

Figure 5:
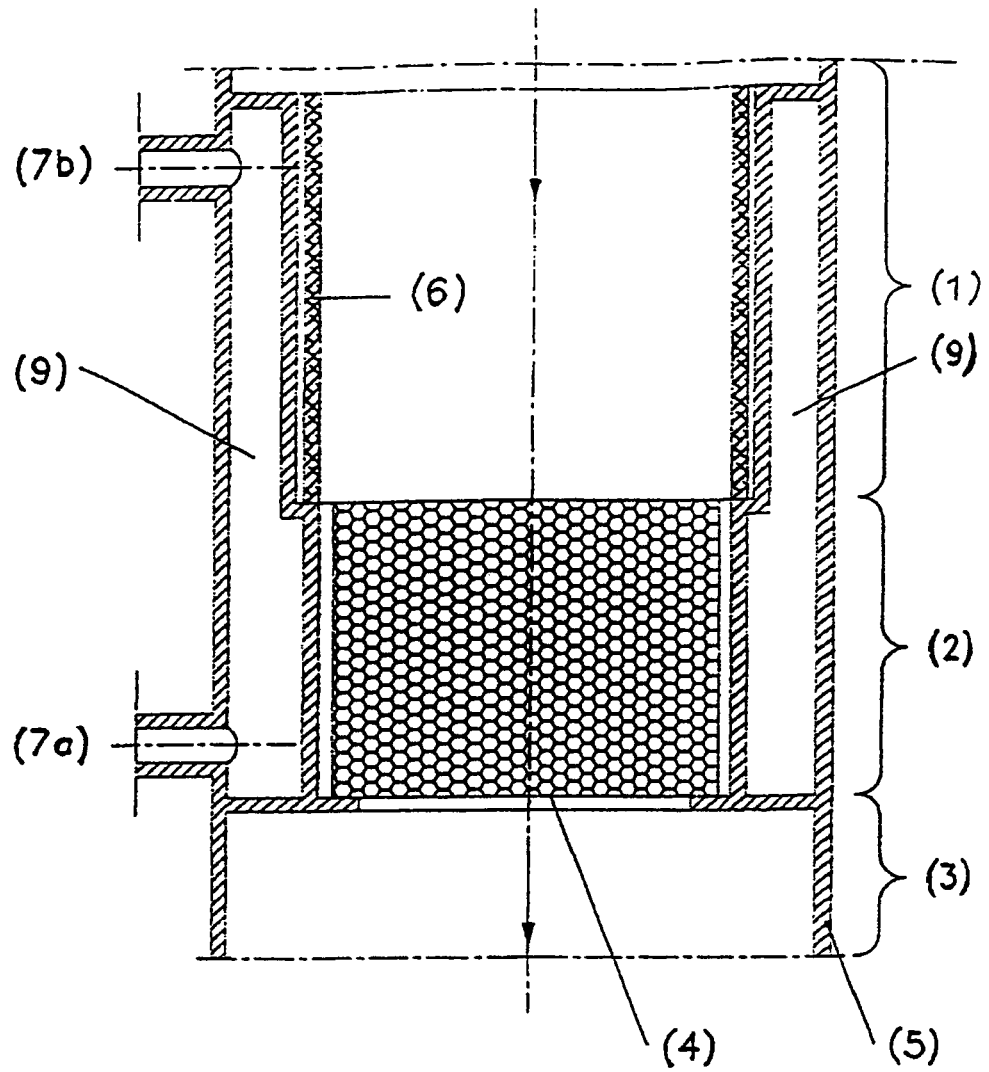
FIG. 5 shows a further apparatus according to the invention in longitudinal section.

FIG. 5 shows an apparatus similar to that in FIG. 3. However, here the insulating liner (6) is present only at the height of the inlet zone (1).

This ammonia oxidation apparatus also comprises an inlet zone (1), reaction zone (2) and outlet zone (3).

The ammonia/oxygen-containing gas mixture is introduced into the inlet zone (1). The mixture then impinges on the ammonia oxidation catalyst (4) in the reaction zone (2). The product mixture from the oxidation reactions subsequently leaves the reaction zone (2) through the outlet zone (3).

The wall (5) of all three zones holds the catalyst (4) and the insulating liner (6). The wall (5) can itself represent the walls of a pressure vessel or the wall (5) can alternatively be accommodated in a space which is in turn surrounded by a pressure jacket (not shown here).

The wall (5) is configured as a double wall at the height of the inlet zone and reaction zone (1, 2). Connections (7a, 7b) for a cooling medium are also provided there. The cooling medium can flow in cocurrent or countercurrent to the flow direction of the feed gas mixture. Thermal decoupling of the inlet zone (1) from the reaction zone (2) is effected both by the insulating liner (6) and passage of a cooling medium through the space (9) in the double wall of the wall (5).

The insulating liner (6) which consists of a thermally insulating material and covers the wall (5) at the height of the inlet zone (1) prevents heat, reaching the inlet zone (1) from the reaction zone (2) as a result of thermal conduction through the wall (5), from being transferred to the feed gas mixture. Since the insulating liner (6) has only a low thermal conductivity, the insulating liner (6) also prevents or hinders direct heat transport along the insulating liner (6) from the reaction zone (2) to the inlet zone (1).

The cooling medium flows through the space (9) in the double wall of the wall (5) and cools the inner wall of the wall (5). This effects further thermal decoupling of the inlet zone (1) from the reaction zone (2) since the heat reaching the inlet zone (1) from the reaction zone (2) by thermal conduction through the wall (5) is transferred to the cooling medium. After flowing through the double wall, the cooling medium leaves the space (9) in the double wall again through one of the connections (7a, 7b).

The action of the insulating liner (6) is reinforced by the cooling by means of the cooling medium. As a result of suitable choice of insulating materials and their thickness and of the cooling medium, the temperature of the wall of the insulating liner (6) facing the feed gas mixture remains below the ignition or reaction temperature of the feed gas mixture and undesirable premature reactions are suppressed.

EXAMPLE 6

Figure 6:
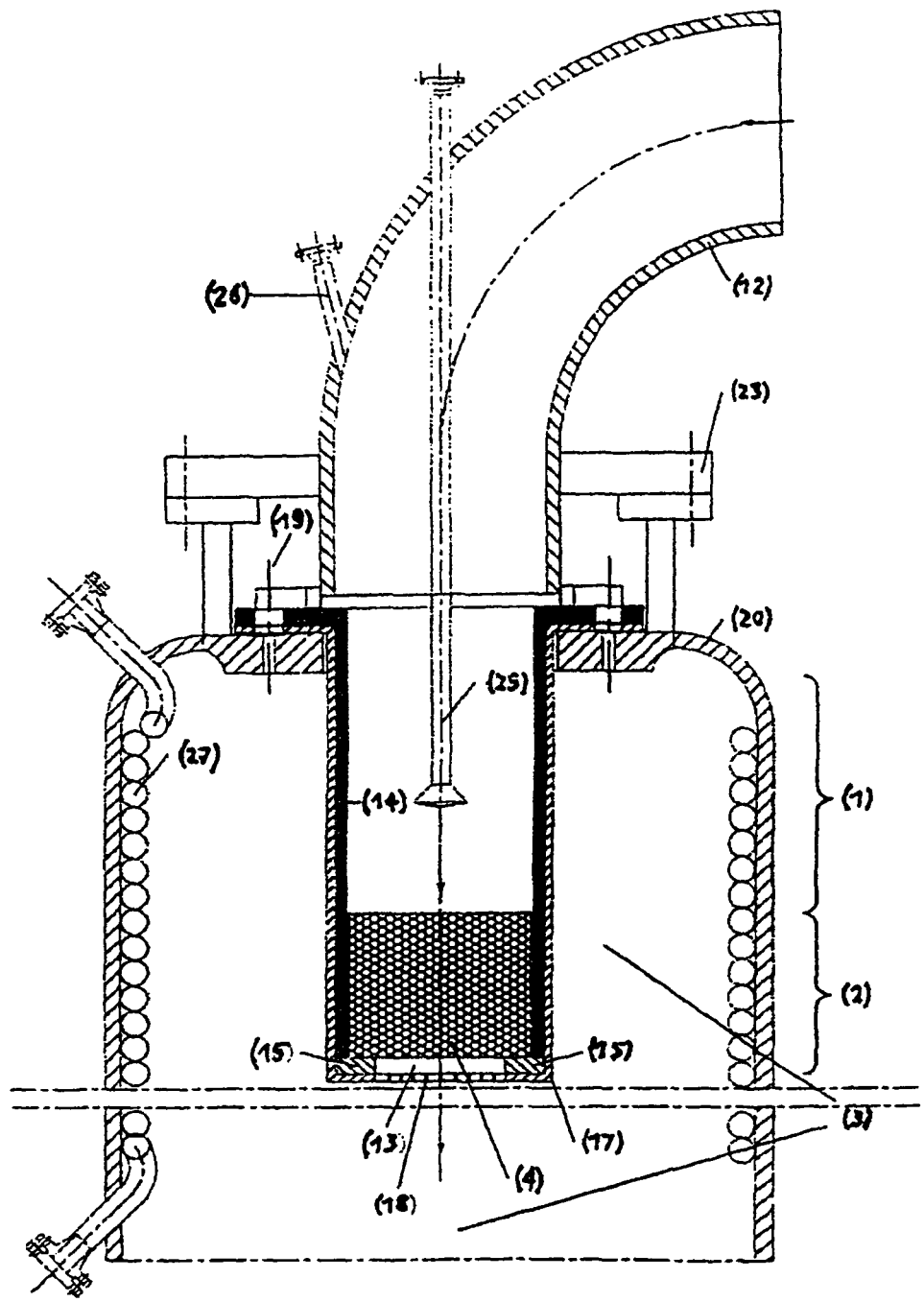
FIG. 6 shows an ammonia oxidation reactor which has been modified according to the invention in longitudinal section.

This embodiment is suitable mainly for replacing the existing cap of a conventional ammonia oxidation reactor. FIG. 6 shows an ammonia oxidation reactor according to the invention.

An oxygen- and ammonia-containing mixture enters the apparatus through the pipe section (12). The mixture is passed over an ammonia oxidation catalyst (4), which in the present case is configured as a honeycomb and on and/or in which a honeycomb support is located. There, the ammonia is converted into nitrogen monoxide by reaction with part of the oxygen in the feed mixture. As a result of the exothermic reaction, a temperature increase occurs in the ammonia oxidation catalyst (4) which is located in the reaction zone (2). The hot product mixture flows through the opening (13) downstream of the ammonia oxidation catalyst (4) into a space (3) which represents the outlet zone. After this space (3), the hot product gas is fed into a gas turbine (which is not shown here) or one or more heat exchangers (not shown here) to recover energy or to use the process heat in another way.

To effect thermal decoupling of the feed inflow side from the reaction zone (2), the ammonia oxidation catalyst (4) is inserted into a sleeve (14) made of a heat-resistant thermally insulating material, for example ceramic or fused silica. This prevents any preignition of the ammonia- and oxygen-containing feed gas mixture. The ammonia oxidation catalyst (4) sits loosely in the sleeve (14) and rests on a support ring (15) and, in the case of a multipart catalyst (4), a plurality of support bars (not shown) of heat-resistant material, for example ceramic or fused silica. The support ring (15) prevents any bypass of gas. The support bars, if installed, are designed so that they occupy only an insignificant proportion of the flow cross section.

To support and protect the sleeve (14), this is surrounded by a metal sleeve (16) made of high-temperature-resistant material. The lower end of the metal sleeve (16) is provided with a lip (17) which supports the support bar or support ring (15) and thus indirectly also the catalyst (4). At the lower end of the metal sleeve (16) there is a grating (18) through which the product gas flows from the ammonia oxidation catalyst (4) into the space (3). The grating (18) serves to stabilize the metal sleeve (16) mechanically and to support any support bars. If the ammonia oxidation catalyst (4) does not consist of only one part but is composed of a plurality of parts, the grating (18) serves to support the individual parts via the support bar. Should the sleeve (14) break in an unforeseeable way, for instance as a result of thermal stress, metal sleeve (16), lip (17) and grating (18) also stop the sleeve (14) and ammonia oxidation catalyst (4) from falling down into the space (3).

Sleeve (14) and metal sleeve (16) are connected by means of bolts and nuts (19) to the pressure jacket (20) of the ammonia oxidation reactor. The pressure space is closed off from the outside by a pressure flange (23) installed on the vessel.

To replace the catalyst, the pipe section (12) is removed by releasing the screw connections. The nuts or bolts (19) are subsequently released and the metal sleeve and ceramic or fused silica sleeve (16, 14) together with the ammonia oxidation catalyst (4) are removed from the reactor. To minimize the downtime (also compared to a conventional ammonia oxidation reactor), a second unit which comprises metal and ceramic or fused silica sleeves (16, 14) and fresh ammonia oxidation catalyst (4) and has been prepared before shutdown can be installed immediately in the reactor.

To aid the ammonia oxidation reaction during start-up if required, the ammonia oxidation catalyst (4) can be preheated or activated by means of an ignition lance (25). The ignition lance (25) comprises a thin tube through which hydrogen is fed into the ammonia oxidation reactor and a device which can ignite the hydrogen stream at the open end of the ignition lance.

The sight glass (26) installed in the bend of the ammonia oxidation reactor allows monitoring of the ignition process and checking of the state of the ammonia oxidation catalyst (4) during operation. Monitoring can be carried out visually or by means of appropriate measuring devices such as photometers.

To moderate the temperature stress on the material of the wall of the pressure vessel in the space (3) downstream of the ammonia oxidation catalyst (4), the wall is provided with a thinned tube cooling facility (27) installed on the inside. Water or another cooling medium flows through the tubes of the thinned wall.

EXAMPLE 7

Figure 7:
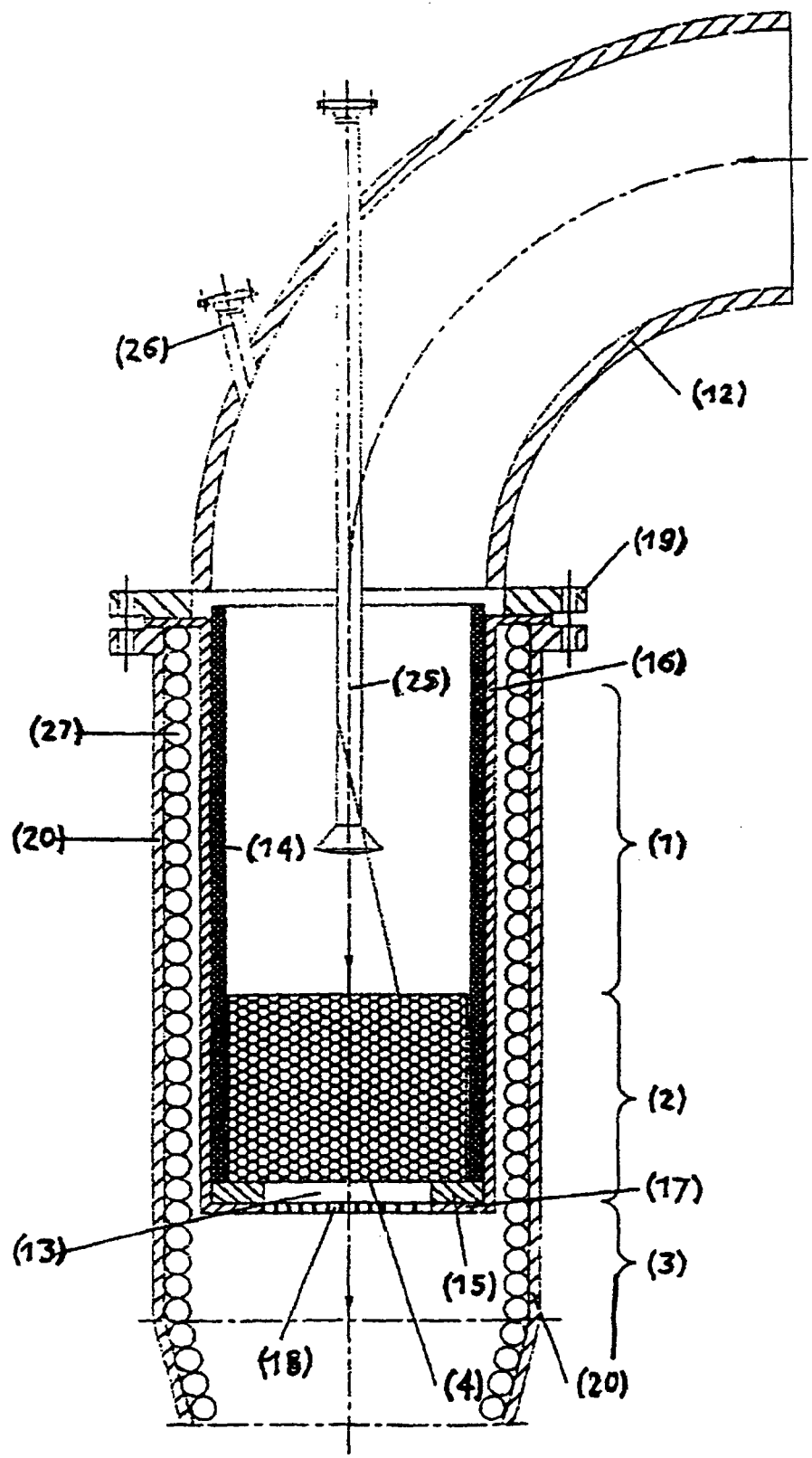
FIG. 7 shows a further apparatus according to the invention in longitudinal section.

This embodiment of an ammonia oxidation reactor according to the invention shown in FIG. 7 is particularly suitable for equipping new plants for producing NO, since matching to the diameter of an existing heat recovery apparatus, e.g. a boiler, is no longer necessary.

The main difference from the reactor of example 6 is that the thinned wall (27) fits closely against the metal sleeve (16) and adaptation to the generally larger diameter of a downstream apparatus is not necessary. In this embodiment, the downstream apparatuses can be matched to the ammonia oxidation reactor. As an alternative to the depicted suspension of the metal sleeve (16), the metal lip (17) provided to support the catalyst (4) can be installed directly on the thinned wall (27) instead of on the metal sleeve (16). This has a positive effect on the mechanical stability of the construction.

The other elements shown in FIG. 7 correspond to the elements of FIG. 6. These are the opening (13), support ring (15), grating (18), bolts and nuts (19), pressure jacket (20), ignition lance (25) and sight glass (26).

COMPARATIVE EXAMPLES 8A TO 8C AND EXAMPLE 8D ACCORDING TO THE INVENTION

In a test using transition metal oxide honeycomb catalysts for the oxidation of $NH_3$, in which an attempt was made, as a departure from the otherwise customary dimensioning of the catalyst, to focus the flow onto a smaller inflow area with a comparatively deep catalyst bed (5 cm), only a low selectivity in respect of $NO_x$ formation was found in the experimental reactor under atmospheric conditions at a linear velocity of 1.0 m/s.

Even increasing the linear velocity to 2.0 m/s led to only an unsatisfactory improvement in the $NO_x$ selectivity. The results are shown in Table 1 below.

fused silica. The reactor tube was positioned in a tube furnace by means of which possible heat losses could be compensated. Temperature regulation was effected with the aid of a thermocouple arranged about 0.5 cm below the catalyst honeycomb (outlet end). The temperature at the outlet end was a constant 900° C.

The composition of the inflowing and outflowing gas stream was analyzed by means of an FTIR analyzer (model Avatar from Nicolet) using a gas cell.

The findings presented in table 1 for experiments 8a to 8c can be explained by a significant proportion of the $NH_3$ fed in being decomposed into $N_2$ and $H_2O$ before entering the catalyst zone, as was confirmed by an analogous experiment in an empty reactor tube. Here, complete conversion of $NH_3$ leading essentially to formation of $N_2$ and $H_2O$ was recorded in the externally heated reaction tube even without the presence of the honeycomb catalyst at a linear velocity of 1.0 m/s.

When the experiment corresponding to example 8c is carried out in a reactor made of fused silica which is a thermal insulator and is at the same time inert, it is surprisingly found that the NO selectivity is drastically increased (cf. example 8d according to the invention).

While the present invention has been described in conjunction with the specific embodiments set forth above, many alternatives, modifications and variations thereof will be apparent to those of ordinary skill in the art. All such alternatives, modifications and variations are intended to fall within the spirit and scope of the present invention which is set forth in the appended claims.

The invention claimed is:

1. An improved reactor for catalytic, exothermic gas-phase reaction of ammonia with oxygen to form a product gas comprising an oxide of nitrogen ($NO_x$), said reactor comprising:
  an inlet zone for a feed gas mixture comprising an admixture of ammonia and an oxidant gas comprising oxygen;
  a reaction zone containing at least one catalyst; and
  an outlet for the $NO_x$ product gas;
  wherein the improvement comprises: means for forestalling reaction between ammonia and oxygen in said inlet zone, comprising:
    means for forestalling undesired reactions at the reactor wall, comprising catalytically inert material disposed over at least the inner surfaces of interior walls of the reactor at least in the inlet zone, wherein said catalytically inert material consists of fused silica; and

TABLE 1

| Example No. | Linear velocity | Space velocity | $NH_3$ conversion | $NH_3$ concentration of the inlet | $NO_x$ selectivity | Reactor material |
|---|---|---|---|---|---|---|
| 8a | 1.0 m/s | 10 000 h$^{-1}$ | ~100% | 10% | 47% | Stainless steel |
| 8b | 2.0 m/s | 20 000 h$^{-1}$ | ~100% | 10% | 59% | Stainless steel |
| 8c | 1.0 m/s | 10 000 h$^{-1}$ | ~100% | 1% | 38% | Stainless steel |
| 8d | 1.0 m/s | 10 000 h$^{-1}$ | ~100% | 1% | 100% | Fused silica |

Experimental Procedure

A mixture of 10% or 1% of ammonia in air was passed through a full honeycomb catalyst (200 csi, length: 5 cm, diameter: 1.8 cm) comprising $LaCoO_3$ perovskite which had been installed in a tubular reactor made of stainless steel or of optionally a first means for reducing heat transport from the reaction zone to the inlet zone comprising at least one insulating liner which insulates the interior space of the reactor from the reactor wall over a region extending at least through the inlet zone up to the reaction zone;

and
wherein the means of forestalling reaction between ammonia and oxygen in said inlet zone optionally further comprises a second means for reducing heat transport from the reaction zone to the inlet zone comprising at least one apparatus for conveying a cooling medium, said apparatus being located at a position in the inlet zone and extending at least through the inlet zone up to the reaction zone.

2. The reactor as claimed in claim 1, wherein said means for forestalling reaction between the ammonia and the oxygen in said inlet zone comprises both:
at least one of said first and second means for reducing heat transport from the reaction zone to the inlet zone extending at least through the inlet zone up to reaction zone; and
means for preventing undesired reactions at the reactor wall, comprising catalytically inert material disposed over at least the inner surfaces of interior walls of the reactor at least in the inlet zone.

3. The reactor as claimed in claim 1, wherein the means for forestalling reaction between ammonia and oxygen in said inlet zone comprises means for transport of a cooling medium located either in the reactor wall or adjacent the reactor wall.

4. The reactor as claimed in claim 1, wherein said means for forestalling reaction between ammonia and oxygen in said inlet zone comprises both:
said first means for reducing heat transport from the reaction zone to the inlet zone comprising at least one insulating liner which insulates the interior space of the reactor from the reactor wall over a region extending at least through the inlet zone up to the reaction zone; and
said second means for reducing heat transport from the reaction zone to the inlet zone comprising at least one apparatus for conveying a cooling medium located in the inlet zone and extending at least through the inlet zone up to the reaction zone.

5. The reactor as claimed in claim 1, wherein inlet zone, reaction zone and outlet zone are surrounded by a reactor wall which additionally supports both:
said catalyst; and
an insulating liner which thermally insulates the interior space of the reactor from the reactor wall and inhibits transfer of heat from the reaction zone to the feed gas in the inlet zone.

6. The reactor as claimed in claim 1, wherein:
the inlet zone, reaction zone and outlet zone are each surrounded by an inner wall and an outer wall, and
an opening for introduction of a cooling medium into the space formed between the inner wall and the outer wall is provided at at least one end of the outer wall to enable the inner wall of the reactor wall to be cooled.

7. The reactor as claimed in claim 6, wherein openings through said outer wall are provided both:
for introduction of cooling medium to the space formed between the inner wall and the outer wall; and
for discharge of cooling medium therefrom.

8. The reactor as claimed in claim 5, further comprising a pressure jacket surrounding the inlet zone, reaction zone and outlet zone.

9. The reactor as claimed in claim 6, further comprising a pressure jacket surrounding the inlet zone, reaction zone and outlet zone.

10. The reactor as claimed in claim 5, wherein said means for forestalling reaction between ammonia and oxygen in said inlet zone comprises, in addition to the insulating liner, an outer wall having at least one connection for a cooling medium and an inner wall supporting for catalyst.

11. The reactor as claimed in claim 6, wherein said means for forestalling reaction between ammonia and oxygen in said inlet zone comprises, in addition to the insulating liner, an outer wall having at least one connection for a cooling medium and an inner wall supporting for catalyst.

12. The reactor as claimed in claim 1, wherein said means for forestalling reaction between ammonia and oxygen in said inlet zone comprises a first sleeve made of heat-resistant and thermally insulating material encompassing said catalyst.

13. The reactor as claimed in claim 12, further comprising:
a second sleeve surrounding the first sleeve, said second sleeve being comprised of a heat-resistant metal having a lower end with a metal lip; and
a grating installed at the lower end of the metal sleeve between the reaction zone and the outlet zone.

14. The reactor as claimed in claim 13, further comprising a pressure jacket surrounding the reactor inlet zone, wherein first sleeve and second sleeve are connected to the pressure jacket by means of bolts and nuts.

15. The reactor as claimed in claim 12, further comprising an ignition lance.

16. The reactor as claimed in claim 13, further comprising an ignition lance.

17. The reactor as claimed in claim 12, further comprising a pressure jacket surrounding the inlet zone, reaction zone and outlet zone and a cooling facility on the inside of the wall of the pressure vessel adjacent said reactor, comprising a spiral tube.

18. The reactor as claimed in claim 13, further comprising a pressure jacket surrounding the inlet zone, reaction zone and outlet zone and a cooling facility on the inside of the wall of the pressure vessel adjacent said reactor, comprising a spiral tube.

19. The reactor as claimed in claim 1, wherein the catalyst comprises transition metal oxides.

20. The reactor as claimed in claim 19, wherein the catalyst is a honeycomb catalyst.

21. The reactor as claimed in claim 19, wherein the catalyst is in the form of a bed having a depth viewed in the flow direction of at least 3 cm.

22. The reactor as claimed in claim 21, wherein the catalyst comprises transition metal oxides.

23. The reactor as claimed in claim 22, wherein the catalyst is a honeycomb catalyst.

24. The reactor as claimed in claim 22, wherein the catalyst is in the form of a bed having a depth viewed in the flow direction of at least 3 cm.

25. The reactor as claimed in claim 9, wherein the catalyst comprises transition metal oxides.

26. The reactor as claimed in claim 25, wherein the catalyst is a honeycomb catalyst.

27. The reactor as claimed in claim 25, wherein the catalyst is in the form of a bed having a depth viewed in the flow direction of at least 3 cm.

28. The reactor as claimed in claim 13, wherein the catalyst comprises transition metal oxides.

29. The reactor as claimed in claim 28, wherein the catalyst is a honeycomb catalyst.

30. The reactor as claimed in claim 18, wherein the catalyst is in the form of a bed having a depth viewed in the flow direction of at least 3 cm.

31. The reactor as claimed in claim 17, wherein the catalyst comprises transition metal oxides.

32. The reactor as claimed in claim 21 wherein the catalyst is a honeycomb catalyst.

33. The reactor as claimed in claim 21, wherein the catalyst is in the form of a bed having a depth viewed in the flow direction of at least 3 cm.

34. A reactor for catalytic, exothermic gas-phase reactions by reaction of a feed gas comprising ammonia to form a product gas comprising nitric oxide, wherein the reactor comprises, viewed in the flow direction of the feed gas, an inlet zone, a reaction zone containing at least one catalyst and an outlet zone for the nitric oxide product gas, wherein a feed gas mixture comprising ammonia is introduced into the inlet zone, said reactor comprising:
    at least one insulating liner insulating at least a portion of the reactor wall from the interior space of the reactor, said insulating liner extending through a region including at least the height of the inlet zone up to and including extending through the region including the combined height of both the inlet zone and the reaction zone; and
    at least one means for reducing heat transport from the reaction zone to the inlet zone comprising means for conveying a cooling medium provided in the region including the inlet zone and extending at least up to the reaction zone;
    wherein the interior walls of the reactor consist of catalytically inert material in a region of the reactor which extends at least through the inlet zone of the reactor up to extending through the inlet zone and the reaction zone, and wherein further said catalytically inert material consists of fused silica.

35. The reactor as claimed in claim 34, wherein the means for conveying a cooling medium extend through both the inlet zone and the reaction zone.

36. The reactor as claimed in claim 34, further comprising an exterior wall surrounding said insulating liner, wherein said at least one insulating liner insulating at least a portion of the reactor wall from the interior space of the reactor extends through both the inlet zone and the reaction zone; and the means for conveying a cooling medium extends through both the inlet zone and the reaction zone and is located between the insulating liner and the exterior wall.

37. The reactor as claimed in claim 34, further comprising a reactor wall surrounding said inlet zone, reaction zone and outlet zone, the reactor wall being adapted to support both the catalyst and the insulating liner.

38. The reactor as claimed in claim 34, further comprising:
    an inner wall and an outer wall, both surrounding the inlet zone, reaction zone and outlet zone; and
    a provision for introduction of a cooling medium into the space formed between said inner wall and said outer wall.

39. A reactor for catalytic, exothermic gas-phase reactions by reaction of a feed gas comprising ammonia to form a product gas comprising nitric oxide (NO), which reactor comprises, viewed in the flow direction of the feed gas, an inlet zone, a reaction zone containing at least one catalyst and an outlet zone for the NO product gas, wherein a feed gas mixture comprising ammonia is introduced into the inlet zone, said reactor comprising:
    (a) an inner wall and an outer wall, both surrounding the inlet zone, reaction zone and outlet zone;
    (b) at least one insulating liner insulating at least a portion of the reactor wall from the interior space of the reactor, said insulating liner extending through a region including at least the height of the inlet zone up to and including extending through the region including the combined height of both the inlet zone and the reaction zone;
    (c) means for conveying a cooling medium provided in the region including the inlet zone and extending at least up to the reaction zone;
    (d) a provision for introduction of the cooling medium into the space formed between said inner wall and said outer wall; and
    (e) at least one opening extending through the inner wall through which the cooling medium may enter the inlet zone and mix with the feed gas mixture therein;
    wherein interior reactor walls consist of catalytically inert material in a region of the reactor which extends at least through the inlet zone of the reactor up to extending through the inlet zone and the reaction zone, wherein further said catalytically inert material consists of fused silica.

40. The reactor as claimed in claim 39, further comprising a pressure jacket surrounding said inlet zone, reaction zone and outlet zone.

41. The reactor as claimed in claim 40, further comprising a first sleeve made of a heat-resistant and thermally insulating material encompassing the catalyst.

42. The reactor as claimed in claim 41, further comprising a grating and a second sleeve surrounding the first sleeve, said second sleeve being comprised of a heat-resistant metal, the lower end of said second sleeve having a lip supporting said grating.

43. The reactor as claimed in claim 42, further comprising a cooling facility on the inside of the wall of the pressure vessel adjacent said reactor, comprising a spiral tube.

44. The reactor as claimed in claim 43, wherein the catalyst comprises transition metal oxides.

45. The reactor as claimed in claim 44, wherein the catalyst comprises a honeycomb.

46. The reactor as claimed in claim 44, wherein the catalyst is disposed on solid particles arrayed in a bed having a depth viewed in the flow direction of at least 3 cm.

47. A reactor for oxidation of ammonia comprising:
    a reactor housing having defined therein: an inlet region, a catalyst region and an outlet region, with a wall surrounding each of said inlet region, said catalyst region and said outlet region;
    a catalyst effective to selectively oxidize ammonia to nitric oxide, NO, disposed in said catalyst region and supported by said reactor housing;
    a catalytically inert ceramic liner disposed within said reactor housing, encompassing and spaced from said catalyst, said catalytically inert ceramic liner extending from said catalyst region through said inlet region and being spaced from the walls of said catalyst region and said inlet region, wherein said catalytically inert ceramic liner consists of fused silica; and
    means for passing a gaseous feedstream comprising a mixture of ammonia and oxygen through said inlet region, said catalyst region and said outlet region.

48. The reactor of claim 47 wherein said catalyst comprises a transition metal oxide.

49. The reactor of claim 47 wherein said catalyst is a honeycomb monolith comprising a transition metal oxide.

50. The reactor of claim 49 wherein the length of said honeycomb monolith is at least 3 cm.

51. The reactor of claim 47 wherein said catalyst comprises a porous bed comprising particles of a transition metal oxide.

52. The reactor of claim 51 wherein the depth of said porous bed is at least about 3 cm.

53. The reactor of claim 47 further comprising:
- an inner wall, interior to said housing and defining a passageway therebetween and encompassing said catalytically inert ceramic liner at least in said inlet region; and
- means for conveying cooling fluid through said passageway between said inner wall and said housing.

54. The reactor of claim 47 further comprising means for initiating catalytic oxidation of ammonia to nitric oxide on the surface of said catalyst.

55. The reactor of claim 47 further comprising:
- means for initiating catalytic oxidation of ammonia to nitric oxide on the surface of said catalyst;
- an inner wall, interior to said housing and defining a passageway therebetween and encompassing said catalytically inert ceramic liner at least in said inlet region; and
- means for conveying cooling fluid through said passageway between said inner wall and said housing;

and wherein:
- said catalytically inert ceramic liner consists of fused silica; and
- said catalyst is a honeycomb monolith comprising a transition metal oxide and having a length of at least 3 cm.

56. The reactor of claim 47 further comprising:
- means for initiating catalytic oxidation of ammonia to nitric oxide on the surface of said catalyst;
- an inner wall, interior to said housing and defining a passageway therebetween and encompassing said catalytically inert ceramic liner at least in said inlet region; and
- means for conveying cooling fluid through said passageway between said inner wall and said housing;

and wherein:
- said catalytically inert ceramic liner consists of fused silica; and
- said catalyst comprises a porous bed comprising particles of a transition metal oxide having depth of at least about 3 cm.

57. An improved reactor for catalytic, exothermic gas-phase reaction of ammonia with oxygen to form a product gas comprising an oxide of nitrogen ($NO_x$), said reactor comprising:
- an inlet zone for a feed gas mixture comprising an admixture of ammonia and an oxidant gas comprising oxygen;
- a reaction zone containing at least one catalyst; and
- an outlet for the $NO_x$ product gas;

wherein the improvement comprises:
- catalytically inert material disposed over at least the inner surfaces of interior walls of the reactor at least in the inlet zone, wherein said catalytically inert material consists of fused silica; and
- optionally at least one insulating liner which insulates the interior space of the reactor from the reactor wall over a region extending at least through the inlet zone up to the reaction zone;

and
wherein the improvement further comprises at least one apparatus for conveying a cooling medium, said apparatus being located at a position in the inlet zone and extending at least through the inlet zone up to the reaction zone wherein:
- the inlet zone, reaction zone and outlet zone are each surrounded by an inner wall and an outer wall, and
- an opening for introduction of a cooling medium into the space formed between the inner wall and the outer wall is provided at at least one end of the outer wall to enable the inner wall of the reactor wall to be cooled,
- such that the inner wall comprises at least one opening extending through the inner wall through which the cooling medium may enter the inlet zone and mix with the feed gas mixture therein.

* * * * *